E. BALKEMA.
Wagon-Axle.
No. 163,963.
Patented June 1, 1875.
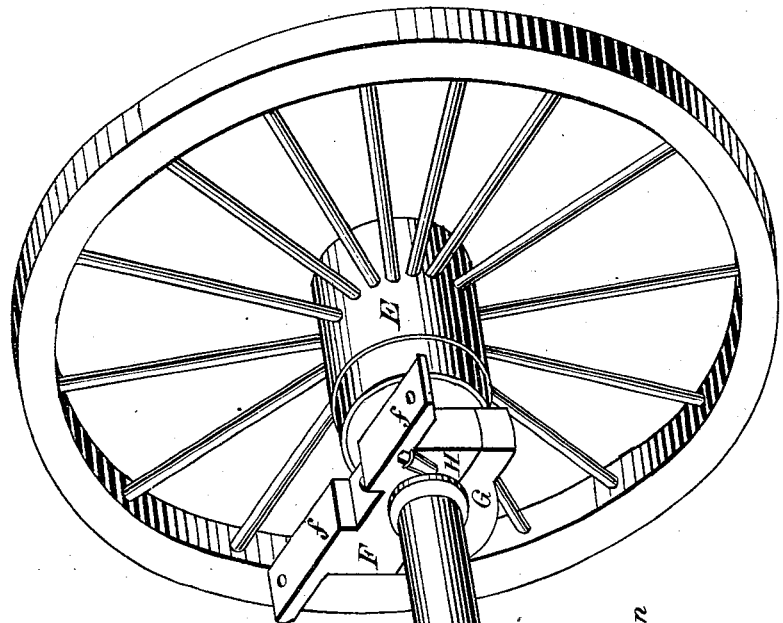
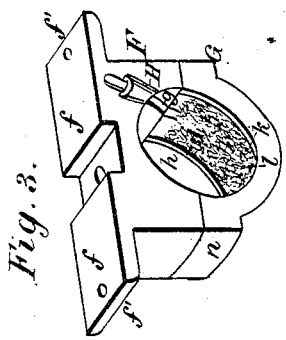
Fig. 3.
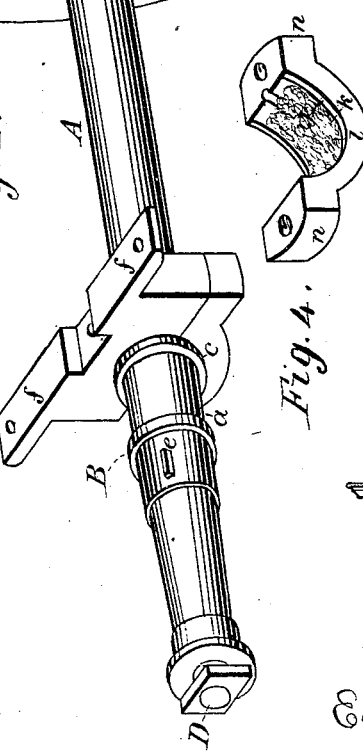
Fig. 1.
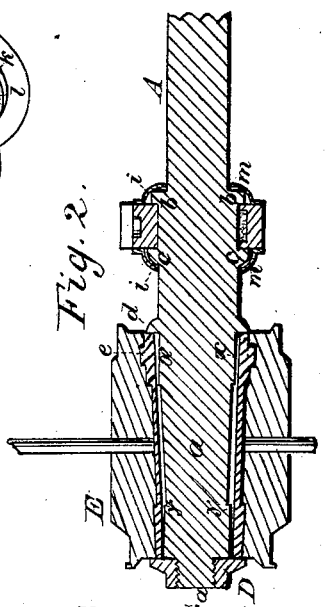
Fig. 4.
Fig. 2.
Witnesses
Charles Thurman.
R. N. Dyer.
Inventor
Edward Balkema
by Geo. W. Dyer
Atty.
THE GRAPHIC CO. PHOTO-LITH. 39 & 41 PARK PLACE, N.Y.

UNITED STATES PATENT OFFICE.

EDWARD BALKEMA, OF LA FAYETTE, INDIANA.

IMPROVEMENT IN WAGON-AXLES.

Specification forming part of Letters Patent No. 163,963, dated June 1, 1875; application filed April 30, 1875.

*To all whom it may concern:*

Be it known that I, EDWARD BALKEMA, of La Fayette, in the county of Tippecanoe and State of Indiana, have invented a new and useful Improvement in Wagon-Axles; and I do hereby declare that the following is a full and exact description of the same, reference being had to the accompanying drawings and to the letters of reference marked thereon.

The object I have in view is an improvement in axles adapted to all kinds of wagons, carts, and vehicles of every description which run on wheels, whereby the friction on the axles and their various bearings is materially lessened, the wear equally distributed throughout the circumferences of the bearing surfaces, the force required to move any given weight imposed on said axles being greatly reduced, and the durability of the axles, bearings, and wheels — such parts as are usually quickly worn out — materially increased; and my invention therein consists in a revolving axle with revolving traction-wheels, and in the combination of the various operative parts, all as more fully hereinafter described.

To enable others skilled in the art to make and use my invention, I now proceed to describe the same, in connection with the drawings, in which—

Figure 1 is a side view of the axle, with one wheel in position. Fig. 2 is a vertical section through one of the axles, with one journal-box and wheel attached. Fig. 3 is a front elevation of the boxes, and Fig. 4 a separate view of the lower box.

Like letters denote corresponding parts in each figure.

In the drawings, A represents the axle which has nothing peculiar in its construction, and may be made of wood or metal. The axle-arms $a$ have two bearings, $x$ and $y$, which are straight instead of tapering, as in other axles, so that the wheel stands perpendicular at all times, and does not bear against the nut. Upon the axle-arms are fitted rigidly the thimbles B secured upon the same in any convenient or ordinary way.

The thimbles have three flanges $b$, $c$, and $d$, against the last-named one the inner end of the thimble-skein rests, and thereby is restrained from lateral movement in one direction. An ordinary cap-nut, D, which is screwed upon the threaded end of the thimble, restrains the lateral movement of the thimble-skein in the other direction.

The thimble-skein, before named, is of a form adapted to slip over the thimble and rotate upon it, and has lugs $e$, by means of which, forced into the interior of the hub E of the wheel, the same is firmly secured thereto, and in the revolution of the wheel the thimble-skein turns upon the thimble whenever the wagon is turned or any very heavy weight is imposed upon it. It is not necessary, therefore, to lubricate the axle more than three or four times a year.

The axle has also an additional and independent revolution in the boxes F and G, which encircle the thimble between the flanges $b$ and $c$. Of these boxes, the upper one, F, has an upper plane-surface, $f$, adapted to receive and be secured to such parts of the wagon-frame as may rest upon it, in which purpose it is assisted by projecting ends $f'$. To this box is attached any suitable lubricating reservoir or cup H, from which the lubricant may flow down through the opening $g$ upon that part of the thimble inclosed in the boxes. The under part of this box F is cut away at $h$ to conform to that portion of the thimble which it turns upon. Around this portion $h$ there is on each side a dust-flange, $i$, adapted to fit closely to and cover the flanges $b$ and $c$ of the thimble. The lower box G is cut away at $j$, similarly to the part $h$ in the upper box, and for the same purpose. This box has in the cut-away portion a recess, $k$, for the reception of suitable packing $l$, and has dust-flanges, $m$, corresponding to the dust-flanges on the upper box, and for the same purpose. It has, also, projecting ends or wings $n$, through which it is firmly screwed or bolted to the upper box.

The particular advantage of my device lies in the lessening of friction by dividing the same between the top of the thimble, where it turns in the box, and the bottom of the thimble, where the thimble-skein turns upon it, thereby lessening the draft required in moving weights or burdens on the wagon.

I am aware that revolving axles are not new, and do not pretend to have been the first to invent the same; but as such have been used with traction-wheels rigidly attached and turning with the axle, I do not regard such as covering my invention.

Having thus described my invention and explained some of its advantages, what I claim as new, and desire to secure by Letters Patent, is—

1. An axle adapted to turn in boxes, combined with a thimble-skein adapted to turn upon the thimble, so that there is an independent revolution of the axle and of the traction-wheels, all substantially as and for the purpose set forth.

2. In combination, an axle, a box in which it is to revolve, and thimble-skeins capable of revolution upon a thimble rigidly attached to said axle, substantially as and for the purpose set forth.

This specification signed and witnessed this 14th day of April, 1875.

EDWARD BALKEMA.

Witnesses:
RUDOLPH SCHWEGLER,
PETER VITZ.